Feb. 3, 1942.   M. F. LEFTWICH   2,271,738
BATTERY CHARGER
Filed Feb. 27, 1939

Mason F. Leftwich
Inventor

By Paul S Eaton
Attorney

Patented Feb. 3, 1942

2,271,738

UNITED STATES PATENT OFFICE 2,271,738

BATTERY CHARGER

Mason F. Leftwich, Charlotte, N. C.

Application February 27, 1939, Serial No. 258,748

2 Claims. (Cl. 175—363)

This invention relates to an apparatus for automatically charging storage batteries at a constant voltage, regardless of load or current drawn from battery and regardless of variations of incoming alternating current line voltage.

It is a well known fact that in order to properly maintain a storage battery, it is necessary to hold a constant floating voltage on each cell of the battery regardless of drain on said battery. This is particularly true when storage batteries are held in readiness for emergency or standby service.

An object of this invention is to provide an automatic self-regulating electronic battery charger of greater accuracy and being simpler than those heretofore used.

Another object of this invention is to maintain a constant charging voltage on a storage battery regardless of amperes or load drawn from said battery.

A further object of this invention is to maintain a constant charging voltage on a storage battery even though incoming alternating current line voltage fluctuates.

A still further object of this invention is to maintain a constant charging voltage on a storage battery automatically in such a manner that it is possible to maintain said voltage without manual control.

Another object of this invention is to provide an electronic battery charger which automatically varies the charging rate proportionally with the demands on the battery.

Still another object of this invention is to provide a battery charger which is free from troublesome moving members such as rotating or vibrating parts.

Other objects and details of this novel system will be more clearly understood from the following description and accompanying drawing, in which.

Figure 1:
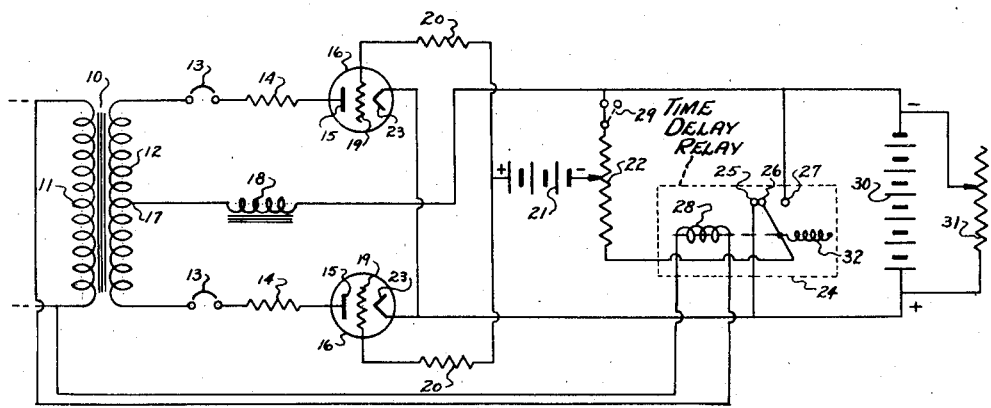
Figure 1 is a schematic wiring diagram of a single phase, full wave, two tube automatic self-regulating battery charger in one of its simplest forms.

Referring to Figure 1, the numeral 10 indicates a transformer with primary 11 connected to a single phase alternating current source. The secondary 12 connects to plates 15 of the positive grid controlled rectifier tubes 16 through thermal overload breakers or protective plate overload relays 13, and current limiting resistors 14. The mid-point 17 of secondary 12 is connected to a smoothing inductance 18 which in turn is connected to one side of a switch 29, the back contact 27 of relay 24 and to negative of storage battery 30.

Control grids 19 of tubes 16 connect through resistors 20 to the positive terminal of a "B" battery 21. The negative of battery 21 connects to movable arm of voltage divider 22, one end of which is connected to switch 29, and the other end to movable contact 26 of relay 24.

Cathodes 23 of tubes 16 connect to front contact 25 of relay 24 and to positive of said storage battery 30. Variable resistor 31 represents load across storage battery 30 which is being charged at a constant voltage from charger.

As can be readily observed, the circuit in Figure 1 is similar to a conventional full wave single phase rectifier in that the plates 15 of the positive controlled tubes 16 are connected to each end of secondary winding 12 and in that the cathodes 23 are positive and are connected together to form one polarity of the rectifier. The cathodes are directly or indirectly heated in the conventional manner by a filament, not shown in this circuit so as to simplify wiring diagram. The negative side of this rectifier is also very similar to a conventional system in that it is tapped from point of zero alternating current potential at the center of secondary 12.

The method of controlling the grids and thereby controlling the firing of the tubes which in turn controls voltage output to storage battery being charged is new. Further explanation will follow.

The common grid source consists of the voltage divider 22 which is connected across the storage battery being charged together with a source of positive direct current grid bias represented by numeral 21. A conventional "B" battery or dry cells may be used as grid bias since current drain is very small. The voltage of this battery is determined by the voltage of the storage battery being charged and by the characteristics of the grid controlled tubes 16. The bias voltage selected is usually about one-third that of the storage battery being charged.

When load 31 is applied to the storage battery 30, a slight reduction of voltage will appear in said battery. This slight voltage decrease will appear through the grid control circuit at voltage divider 22 and source of constant potential 21. This permits tubes 16 to conduct earlier in the alternate halves of the cycle thus causing rectified current to flow through the tubes for a longer part of the alternate cycle. Thus the rectified output voltage is automatically increased to bring the storage battery back to its predetermined regulated value. This constant voltage can be adjusted to any desired value by moving the arm of voltage divider 22. The voltage of "B" battery 21 is so selected as to be great enough to obscure any variations in the critical grid voltage depending on the type of grid controlled rectifier tube used. This is the reason that the output voltage of the battery charger is constant regardless of fluctuations in incoming alternating current line voltage.

Since it is usually necessary to heat up practically all types of grid controlled rectifying tubes for a short period prior to applying plate voltage, a time delay relay is incorporated in this circuit for this purpose. Any suitable relay may be used such as a thermal, motor-driven, or bellows type. This relay action is incorporated in this circuit by controlling potential to tube grids. The relay for this purpose is designated by the numeral 24 in Figure 1.

Coil 28 is energized by the same source of power as that which feeds filaments of tubes 16. Contact position as shown on Figure 1 is for normal operation after time delay action has taken place. In case of power failure, coil 28 would become de-energized and contact 26 would be pulled by spring 32 to make contact with point 27. This applies negative potential from storage battery 30 through voltage divider 22 to tube grids 19 thus preventing tubes firing before the allotted time set by relay.

The function of switch 29 is to provide manual control of charger tubes when it is necessary to charge storage batteries continuously. By opening switch 29 thus breaking connection from negative side of storage battery through "B" battery to grids, a predominating positive potential is applied to the grids from the storage battery being charged. This action causes rectifying tubes to fire continuously without automatic features.

Figure 2:
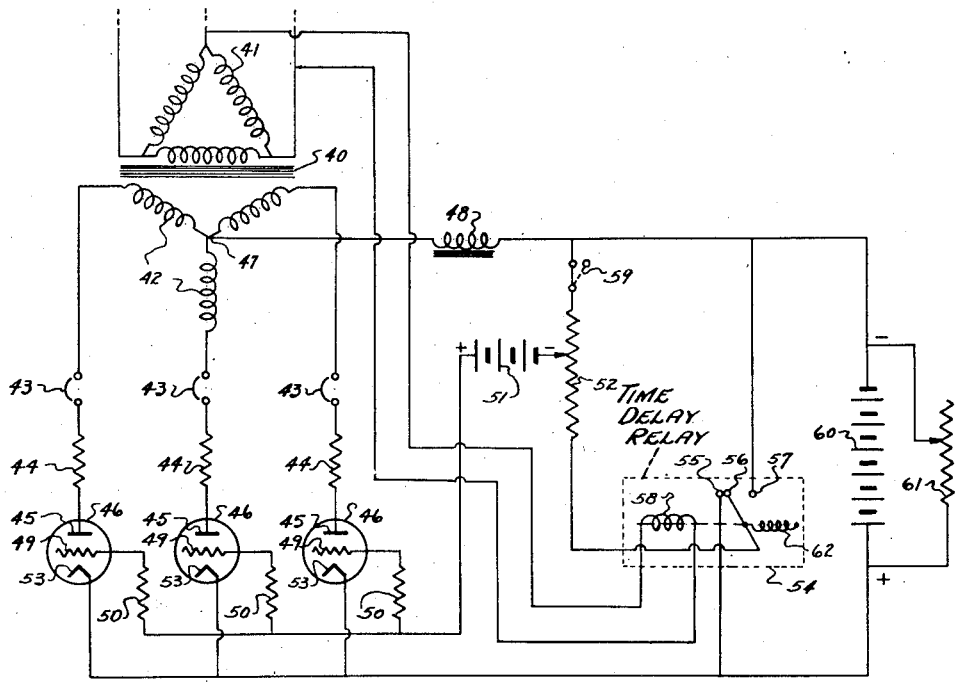
Figure 2 is a schematic wiring diagram of a three phase three tube automatic charger of greater ampere capacity.

Figure 2 is a schematic wiring diagram of a three phase three tube automatic self-regulating battery charger.

Numeral 40 indicates a three phase transformer of which 41 is a delta connected primary which is connected to a source of alternating current. The secondary 42 is Y-connected to plates 45 of tubes 46 through thermal overload breakers 43 and protective resistors 44. The neutral point 47 of transformer secondary 42 is connected through the smoothing inductance 48 to one side of a switch 59, the back contact 57 of relay 54 and to negative of a storage battery 60. Control grids 49 of tubes 46 connect through resistors 50 to positive of grid control "B" battery 51. The negative of battery 51 which is connected to movable contact 56 of a relay 54 the other end to the other side of said switch 59.

Cathodes 53 of tubes 46 connect to the front contact 55 of the relay 54 and to positive of the storage battery 60. Variable resistor 61 is connected across the storage battery 60 and represents a varying load across the storage battery which is being charged at a constant voltage from the charger.

The above described circuit showing three grid controlled rectifying tubes connected as a three phase half wave self regulating charger illustrates that a multiplicity of tubes can be used depending on the size and duty of storage battery. The operation of the circuit shown in Figure 2 is identical to that which has been previously described in Figure 1.

In the drawing and specification, there has been set forth a preferred embodiment of the invention, and although specific terms are employed, they are used in a generic and descriptive sense only and not for the purposes of limitation, the scope of the invention being set forth in the appended claims.

I claim:

1. An electronic control system comprising a transformer, having primary and secondary windings, a grid controlled rectifying tube having a plate, a grid and a cathode; a source of constant potential, a voltage divider, a time delay relay, a connection leading from the grid to the positive side of the source of constant potential, a connection leading from the negative side of the source of constant potential through the voltage divider and through the time delay relay to the positive side of the direct current output circuit, a connection from the secondary of the transformer to the other side of the voltage divider and to the negative side of the direct current output circuit whereby a constant voltage is automatically maintained in the direct current output circuit.

2. An electronic control system comprising a transformer having primary and secondary windings, a grid controlled rectifying tube having a plate, a grid and a cathode; a source of constant potential, a voltage divider, a time delay relay, a connection leading from the grid to the positive side of the source of constant potential, a connection leading from the negative side of the source of constant potential through the voltage divider and through the time delay relay to the positive side of direct current output circuit, a connection from the secondary of the transformer to the other side of the voltage divider and to the negative side of the direct current output circuit, whereby a constant voltage is automatically maintained in the direct current output circuit, regardless of the fluctuations in the voltage in the primary of the transformer.

MASON F. LEFTWICH.